Patented Sept. 26, 1944

2,359,066

UNITED STATES PATENT OFFICE 2,359,066

STABILIZATION OF EMULSIONS

Herbert L. Wampner, Terre Haute, Ind., assignor to Commercial Solvents Corporation, Terre Haute, Ind., a corporation of Maryland No Drawing. Application September 11, 1941, Serial No. 410,438

13 Claims. (Cl. 252—312)

My invention relates to emulsions, and a process for producing the same. More particularly, it relates to stabilized oil-in-water emulsions and to a method for preparing the same.

In the preparation of emulsions of the oil-in-water type, it is customary to bring the ingredients into intimate contact with one another by shaking, agitating, grinding, homogenizing, beating, working in a colloid mill, or using some other means for the purpose of subdividing the disperse phase in intimate contact with the continuous phase, and generally in the presence of a suitable emulsifying agent.

Some of the better-known emulsions of the above type are, for example, furniture polishes which contain various kinds of oils, such as mineral and/or perilla oils, naphtha, and water; hand lotions which are essentially emulsions of a mineral oil with soap and water; vanishing cream which consists essentially of stearic acid, emulsified with stearic acid soaps in water; cleansing creams, and the like.

Emulsions of the above-mentioned type are, in general, made from vegetable, animal, or mineral oils, and fats which are substantially immiscible with water or aqueous liquids. The stability of such emulsions varies; however, upon standing for an appreciable length of time, conditions are brought about which tend to promote the separation of either one or the other phases, or both phases. The rate at which this phenomenon occurs is, of course, dependent upon a number of conditions, such as the relative proportion of emulsifying agent; the character of the emulsifying agent; the thoroughness of initial emulsification; storage conditions, and the like.

Emulsions of the type contemplated by the present invention exhibit at least two types of instability, the more serious of which is the breaking of the emulsions into the original water and oil phases. Ordinarily, this type of instability is found to be due to the use of insufficient emulsifying agent, the use of the wrong emulsifying agent, or the presence of materials which tend to neutralize the action of said emulsifying agent. The second type of instability observed in such emulsions is commonly known in the art as "creaming." The principal cause of such instability is apparently due to a difference in the specific gravity of the oil and water phases. Theoretically, therefore, this type of instability may be overcome by adding to the oil and water phases a third substance which will result in the formation of two phases having the same specific gravity. Thus, for example, it is possible to mix naphtha and ethylene chloride to produce an oil phase having the same specific gravity as water. Such a mixture of naphtha and ethylene chloride, when emulsified with water, shows no tendency to cream. In general, however, from a commercial standpoint it is impractical to add a sufficient quantity of a third material to render the specific gravity of the oil and water phases identical, and consequently this method of overcoming creaming is seldom of much value.

In the past, emulsions of the oil-in-water type employing a sodium or potassium soap as the emulsifier, have been stabilized by the addition of a slight excess of a substance capable of furnishing sodium or potassium ions. Also, hydrocarbon oil-in-water mixtures emulsified by an agent such as casein, have been readily stabilized by the addition of certain inorganic substances, such as aluminum sulfate, thorium nitrate, and barium hydroxide. The action of such materials in rendering emulsions of the above type stable, is not accurately understood, however. Furthermore, this stabilizing effect has only been observed with oil-in-water emulsions of particular composition, although it is possible that the phenomenon involved in the stabilization of such emulsions is concerned with some fundamental underlying principle applicable to all cases.

I have now discovered that emulsions of the oil-in-water type containing as the primary emulsifying agent a short-chain aminohydroxy soap, may be readily and effectively stabilized by the addition of a higher fatty acid salt of an amino alcohol, hereinafter designated as "stabilizing agent," which is capable of producing an emulsion of the opposite type, i. e., a water-in-oil emulsion. This observation is entirely contrary to the result which would be normally expected, since under such circumstances it has generally been found that the addition of an emulsifying agent which ordinarily gives water-in-oil emulsions, and especially an emulsifying agent of the ionizing type, to an oil-in-water emulsion, tends to break the emulsion, rather than increase its stability, and vice versa.

In accordance with the present invention, stabilized oil-in-water emulsions may be prepared by first homogenizing in a suitable colloid mill, or by other convenient means, a mixture consisting of an oil, water, and oil-in-water emulsifying agent, and then adding to the resulting emulsion the desired quantity of stabilizing agent, after which the mixture is agitated until said stabilizer is uniformly dispersed. An alternative method for stabilizing emulsions of the type contemplated by the present invention, comprises preparing a solution of the primary emulsifying agent in the oil, and dissolving the desired amount of stabilizing agent therein. Water may then be added in proper amount, and the whole thoroughly agitated until emulsified.

The amount of stabilizing agent employed may vary, and it will be found that the proportion of stabilizing agent required to produce the most stable emulsion will generally differ with the character of the emulsion. Ordinarily, however, the stabilizing agents of the present invention may be employed in amounts ranging from about 0.5 to 5.0 per cent, and preferably from 2.0 to 3.0 per cent, based upon the weight of the final emulsion, while the primary emulsifying agents may generally be utilized in amounts corresponding to from about 1.0 to 4 per cent by weight of the final emulsion.

The per cent of water in such emulsions may be varied within rather wide limits, depending upon the type and viscosity of the emulsion which seems desirable for the particular use contemplated. Such emulsions, for example, may contain as little as 50 per cent water by weight, or less, while others may contain as much water as is considered necessary or desirable.

The materials which may be employed as the primary emulsifying agent in the present invention may be any substance that is capable of producing oil-in-water emulsions. As examples of common types of such emulsifying agents, there may be mentioned the alkali metal salts or the substituted ammonium salts of the higher fatty acids, such substituted ammonium salts being derived from tris(hydroxyethyl)amine, 2-amino-2-methyl-1-propanol, 2-amino-2-methyl-1,3-propanediol, 2-amino-1-propanol, 2-amino-1-butanol, and the like.

Broadly the stabilizing agents which may be employed in carrying out the present invention may be chosen from a large group of compounds having the general formula:

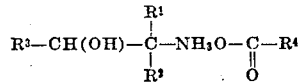

wherein $R^1$ and $R^2$ represent either hydrogen or alkyl, $R^3$ represents an alkyl group, the sum of the carbon atoms represented by $R^1$ plus $R^3$ being greater than two, and $R^4$ represents an aliphatic hydrocarbon radical containing in excess of ten carbon atoms, and preferably from eleven to seventeen carbon atoms.

Specific examples of the materials which may be included by the general formula listed above are the salts formed from lauric, oleic, stearic, and palmitic acids and 2-amino-2-methyl-3-hexanol, 2-amino-2-methyl-3-pentanol, 2-amino-2-methyl-3-heptanol, 2-amino-3-hexanol, 2-amino-3-pentanol, 2-amino-2-methyl-3-octanol, and the like.

The above-mentioned stabilizing agents and emulsions may be prepared in a variety of ways. For example, the stabilizing agent may be prepared by adding the amino alcohol to an equivalent quantity of a suitable higher fatty acid at room or elevated temperatures in the presence or absence of an auxiliary solvent, such as ethyl ether. The salts prepared in this manner may be added directly to the oil-in-water mixture and shaken until the whole is emulsified.

The examples which follow illustrate the improved stability of various oil-in-water emulsions to which have been added a small portion of the stabilizing agents of the present invention, as compared to the stability of similar oil-in-water emulsions in which said stabilizing agent has been replaced by a corresponding amount of a primary emulsifying agent.

*Example I*

To a solution consisting of 200 parts of ethylene dichloride, 15 parts of 2-amino-2-methyl-1-propanol, and 40 parts of oleic acid was introduced 40 parts of 3-hydroxy-2-hexylammonium oleate. Eighteen hundred parts of distilled water was added, and the entire mixture thoroughly shaken until emulsified. A second emulsion in which said 3-hydroxy-2-hexylammonium oleate was replaced by 40 parts of 1-hydroxy-2-methyl-2-propylammonium oleate, but in all other respects identical with the first emulsion, was also prepared. After permitting both emulsions to stand for a period of four days, the mixture containing 3-hydroxy-2-hexylammonium oleate was observed to remain a substantially perfect emulsion, whereas the mixture containing the additional quantity of 1-hydroxy-2-methyl-2-propylammonium oleate had separated into three phases. The stabilized emulsion thus produced is useful for the preparation of scouring and wetting agents, as well as various polishes and insecticides.

*Example II*

To 200 parts of olive oil were added 17.3 parts of tris(hydroxyethyl)amine and 47 parts of oleic acid. This mixture was agitated until a clear solution was obtained, after which 41 parts of 3-hydroxy-2-methyl-2-pentylammonium stearate was dissolved therein. To the solution thus produced was added 1800 parts of distilled water, and the entire mixture shaken until complete emulsification was secured. A second emulsion containing 41 parts of tris(hydroxyethyl)ammonium oleate instead of 3-hydroxy-2-methyl-2-pentylammonium stearate, but in all other respects identical with the first emulsion, was also prepared. After permitting both emulsions to stand for a period of four days, the mixture containing 3-hydroxy-2-methyl-2-pentylammonium stearate remained in a state of substantially complete emulsification, whereas the mixture containing only tris(hydroxyethyl)ammonium oleate as the surface active agent had separated into two phases, the upper phase of which consisted of a concentrated emulsion, while the lower phase constituted a very dilute and translucent emulsion. Stabilized emulsions of the above type are useful in textile treatments, and also find use in the preparation of shampoos and hand lotions.

*Example III*

To a clear solution consisting of 200 parts of high-grade solvent naphtha, 15 parts of 2-amino-2-methyl-1,3-propanediol, and 40 parts of oleic acid, was added, with thorough agitation, approximately 70 parts of 3-hydroxy-2-methyl-2-heptylammonium laurate. A total of 1800 parts of distilled water was next introduced, the mixture being stirred during the addition of said water. When all of the water had been added, the entire mixture was shaken until complete emulsification had occurred. A second emulsion containing an additional 70 parts of 1,3-dihydroxy-2-methyl-2-propylammonium oleate instead of 3-hydroxy-2-methyl-2-heptylammonium laurate, but in all other respects identical with the first emulsion, was also prepared. After permitting both emulsions to stand for a period of four days, the mixture containing 3-hydroxy-2-methyl-2-heptylammonium laurate was still completely emulsified, whereas the emulsion which contained only 1,3-dihydroxy-2-methyl-2-propylammonium oleate as the surface active agent exhibited a marked tendency to cream. Emulsions of the above type, stabilized in the manner described, are useful in the formulation of polishes, cleaning compounds, and insecticides.

It is to be particularly understood that the stabilizing agents of the present invention are in no way limited to those specifically mentioned in the examples and specification, but may be selected from any of such materials which are represented by the generic formula appearing above. Also, the emulsions which are capable of being stabilized by the addition of said agents thereto, do not consist of only those mentioned in the specification and examples, but in general it may be said that any emulsion of the oil-in-water-type may be satisfactorily stabilized in accordance with the present invention.

Having now described my invention, what I claim is:

1. A method of preparing a stabilized oil-in-water emulsion, which comprises making an oil-in-water emulsion from an oleaginous material and water, using a small amount of an emulsifying agent tending to form oil-in-water emulsions, then adding to the resulting emulsion a small quantity of a water soluble soap of an aliphatic amino alcohol, normally tending to form water-in-oil emulsions, to stabilize said oil-in-water emulsion and having the following structure:

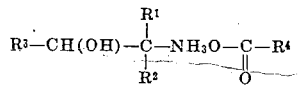

wherein $R^1$ and $R^2$ represent members selected from the group consisting of hydrogen and methyl, $R^3$ represents an alkyl group of from two to five carbon atoms, and $R^4$ is an alkyl group having in excess of ten carbon atoms.

2. A method of preparing a stabilized oil-in-water emulsion, which comprises making an oil-in-water emulsion from an oleaginous material and water, using a small quantity of an alkali metal soap of a higher fatty acid tending to form oil-in-water emulsions, then adding to the resulting emulsion a small quantity of a water soluble soap of an aliphatic amino alcohol, normally tending to form water-in-oil emulsions, to stabilize said oil-in-water emulsion and having the following structure:

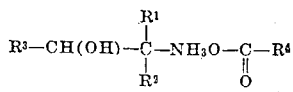

wherein $R^1$ and $R^2$ represent members selected from the group consisting of hydrogen and methyl, $R^3$ represents an alkyl group of from two to five carbon atoms, and $R^4$ is an alkyl group having in excess of ten carbon atoms.

3. A method of preparing a stabilized oil-in-water emulsion, which comprises making an oil-in-water emulsion from an oleaginous material and water, using a small quantity of a soap formed from a higher fatty acid and an aliphatic aminohydroxy compound, said soap tending to form oil-in-water emulsions, then adding to the resulting emulsion a small quantity of a water soluble soap of an aliphatic amino alcohol, normally tending to form water-in-oil emulsions, to stabilize said oil-in-water emulsions and having the following structure:

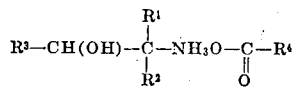

wherein $R^1$ and $R^2$ represent members selected from the group consisting of hydrogen and methyl, $R^3$ represents an alkyl group of from two to five carbon atoms, and $R^4$ is an alkyl group having in excess of ten carbon atoms.

4. A method of stabilizing an oil-in-water emulsion having an oleaginous material as a discontinuous phase and an aqueous liquor as a continuous phase, which comprises adding thereto 3-hydroxy-2-hexylammonium oleate in an amount of from about 0.5 to 5.0 per cent by weight of the final emulsion.

5. A method of stabilizing an oil-in-water emulsion having an oleaginous material as a discontinuous phase and an aqueous liquor as a continuous phase, which comprises adding thereto 3-hydroxy-2-methyl-2-pentylammonium stearate in an amount of from about 0.5 to 5.0 per cent by weight of the final emulsion.

6. A method of stabilizing an oil-in-water emulsion having an oleaginous material as a discontinuous phase and an aqueous liquor as a continuous phase, which comprises adding thereto 3-hydroxy-2-methyl-2-heptylammonium laurate in an amount of from about 0.5 to 5.0 per cent by weight of the final emulsion.

7. A stabilized oil-in-water emulsion having an oleaginous material as a discontinuous phase and an aqueous liquor as a continuous phase and containing two emulsifying agents, one of said agents being capable of forming oil-in-water emulsions and the other serving as a stabilizing agent for said emulsion although normally tending to form water-in-oil emulsions, the latter being present in stabilizing quantities and having the following structure:

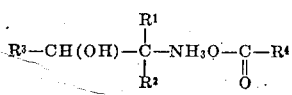

wherein $R^1$ and $R^2$ represent members selected from the group consisting of hydrogen and methyl, $R^3$ represents an alkyl group of from two to five carbon atoms, and $R^4$ is an alkyl group having in excess of ten carbon atoms.

8. A stabilized oil-in-water emulsion having an oleaginous material as a discontinuous phase and an aqueous liquor as a continuous phase and containing two emulsifying agents, one of said agents being capable of forming oil-in-water emulsions and the other serving as a stabilizing agent for said emulsion although normally tending to form water-in-oil emulsions, the latter being present in an amount of from approximately 0.5 to 5.0 per cent by weight of the final emulsion and having the following structure:

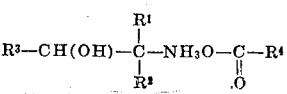

wherein $R^1$ and $R^2$ represent members selected from the group consisting of hydrogen and methyl, $R^3$ represents an alkyl group of from two to five carbon atoms, and $R^4$ is an alkyl group having in excess of ten carbon atoms.

9. A stabilized oil-in-water emulsion having an oleaginous material as a discontinuous phase and an aqueous liquor as a continuous phase, said emulsion containing as the stabilizing agent from about 0.5 to 5.0 per cent of 3-hydroxy-2-hexylammonium oleate by weight of the final emulsion.

10. A stabilized oil-in-water emulsion having an oleaginous material as a discontinuous phase and an aqueous liquor as a continuous phase, said emulsion containing as the stabilizing agent from about 0.5 to 5.0 per cent of 3-hydroxy-2-pentylammonium stearate by weight of the final emulsion.

11. A stabilized oil-in-water emulsion having an oleaginous material as a discontinuous phase and an aqueous liquor as a continuous phase, said emulsion containing as the stabilizing agent from about 0.5 to 5.0 per cent of 3-hydroxy-2-methyl-2-heptylammonium laurate by weight of the final emulsion.

12. A stabilized oil-in-water emulsion having an oleaginous material as a discontinuous phase and an aqueous liquor as a continuous phase and containing two soaps of higher molecular weight fatty acids, one of said soaps having the property of forming oil-in-water emulsions and the other serving as a stabilizing agent for said emulsion although normally tending to form water-in-oil emulsions, the latter being employed in an amount of from about 0.5 to 5.0 per cent by weight of the final emulsion and having the following structural formula:

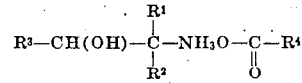

wherein $R^1$ and $R^2$ represent members selected from the group consisting of hydrogen and methyl, $R^3$ represents an alkyl group of from two to five carbon atoms, and $R^4$ is an alkyl group having in excess of ten carbon atoms.

13. A stabilized oil-in-water emulsion having an oleaginous material as a discontinuous phase and an aqueous liquor as a continuous phase and containing two soaps, one of which is prepared by reacting approximately equimolecular proportions of a higher molecular weight fatty acid with an aliphatic aminohydroxy compound having an amino group and a secondary hydroxyl group on adjacent carbon atoms, and the other soap prepared by reacting approximately equivalent proportions of a fatty acid having in excess of eleven carbon atoms with an aliphatic monohydric alcohol of from six to nine carbon atoms, the former soap having the property of forming emulsions of the oil-in-water type, while the latter soap, which serves as a stabilizer for said emulsion, normally tends to produce emulsions of the water-in-oil type, the stabilizing agent being employed in an amount of from about 0.5 to 5.0 per cent, based upon the weight of the final emulsion.

HERBERT L. WAMPNER.